United States Patent [19]

Federighi, Sr.

[11] Patent Number: 5,065,672
[45] Date of Patent: Nov. 19, 1991

[54] PEELER FOR GARLIC OR THE LIKE WITH CENTRIFUGAL DISCHARGE

[76] Inventor: George J. Federighi, Sr., 70 13th St., San Francisco, Calif. 94103

[21] Appl. No.: 604,098

[22] Filed: Oct. 29, 1990

[51] Int. Cl.⁵ .............................................. A23N 7/00
[52] U.S. Cl. ......................................... 99/631; 99/623
[58] Field of Search .................. 99/584, 623, 629–634; 366/314; 241/199.12, 282.1

[56] References Cited

U.S. PATENT DOCUMENTS

| 877,550 | 1/1908 | Clark | 99/631 |
|---|---|---|---|
| 1,188,891 | 6/1916 | Brenizer | 99/633 |
| 1,923,806 | 8/1933 | Anstiss | 99/633 |
| 1,945,978 | 2/1934 | Palombo et al. | 99/632 |
| 2,769,473 | 11/1956 | Comber | 99/633 |
| 2,795,253 | 6/1957 | Coleman et al. | 99/633 |
| 2,838,083 | 6/1958 | Fox et al. | |
| 4,422,764 | 4/1984 | Bos et al. | 99/629 |
| 4,768,429 | 9/1988 | Federighi | 99/631 |

FOREIGN PATENT DOCUMENTS 475585 7/1951 Canada ................................. 99/630

*Primary Examiner*—Timothy F. Simone
*Attorney, Agent, or Firm*—Harris Zimmerman

[57] ABSTRACT

Motor driven apparatus for peeling garlic or similar food products has a housing forming a processing chamber and an abrasive rotary disk in the chamber which abrades the skin or husk from the product. A movable gate partially obstructs a discharge slot at the side of the chamber. The gate has a lowered position at which the unobstructed region of the slot is large enough to enable continuous ejection of peelings but too small to allow escape of the product. The gate is raised at the end of each peeling operation enabling centrifugal ejection of the product by the rotary motion of the disk. Manual unloading and separation of the peelings and product is unnecessary thereby providing for fast, high throughput operations. The apparatus may be an accessory which engages on a food processor base.

15 Claims, 3 Drawing Sheets

FIG_1

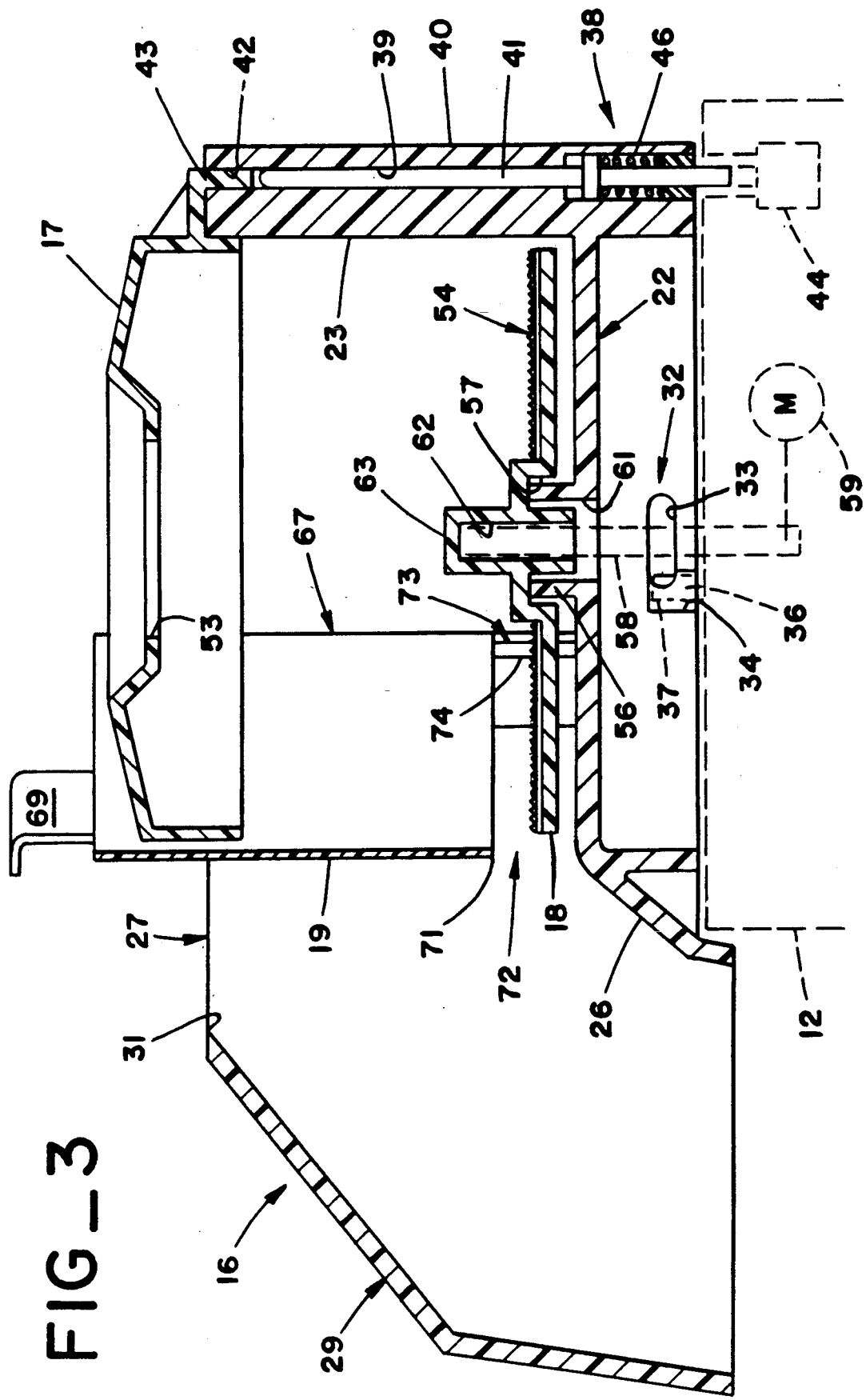
FIG_3

PEELER FOR GARLIC OR THE LIKE WITH CENTRIFUGAL DISCHARGE

TECHNICAL FIELD

This invention relates to food processing equipment and more particularly to motor driven apparatus for removing the skin or hull from garlic bulbs or similar food products. In one form, the invention is a food processor attachment or accessory.

BACKGROUND OF THE INVENTION

Manual peeling of garlic or similar food products with a knife or other instrument is time consuming and requires exacting attention on the part of the food preparer. The garlic aroma which tends to remain on the hands and clothing of the preparer is objectionable to many persons. In the case of onions, peeling releases volatile substances which cause eye irritation.

My prior U.S. Pat. No. 4,768,429, issued Sept. 6, 1988, discloses a food processor attachment which greatly relieves the problems associated with manual peeling of such foodstuffs. The attachment of the prior patent has a bowl in which an abrasive rotary disk is situated. Rotation of the disk by the food processor motor rapidly abrades the dry and brittle skin away from garlic bulbs without damaging the softer tissue of the underlying cloves.

Use of the prior powered garlic peeler requires that the food processor be turned off at the end of a peeling operation and the peeled product and peelings are then manually removed from the bowl and are separated from each other. It would be advantageous if the peeler apparatus itself accomplished these operations. This would be highly convenient where the peeler is used sporadically in the preparation of home meals and would be even more advantageous in restaurants or other establishments where high volume food preparation occurs. A garlic peeler may be used continuously for long periods of time at such locations. The operations which are required in the course of manually removing each batch of the food product and the peelings from the apparatus substantially reduce production rate.

The present invention is directed to overcoming one or more of the problems discussed above.

SUMMARY OF THE INVENTION

In one aspect, the present invention provides apparatus for peeling a food product of the type having an abradable skin. The apparatus includes a housing with a sidewall bounding a processing chamber, an abrasive disk in the chamber and means for rotating the disk. The chamber has an outlet opening at the sidewall that is sufficiently small to prevent passage of the food product through the opening during peeling operations while being large enough to receive peelings that are abraded from the food product. The outlet opening is located in proximity to the periphery of the abrasive disk and centrifugal force expels peelings from the processing chamber during the peeling operations.

In another aspect of the invention, the apparatus includes means for temporarily enlarging the outlet opening following a period of operation to enable centrifugal ejection of the peeled food product through the outlet opening.

In another aspect, the invention provides an attachment for peeling garlic or the like for use with a food processor of the type having an upwardly extending rotary spindle for driving attachments. The attachment includes a housing with a sidewall which bounds a processing chamber and which has a vertically extending slot in the sidewall. The slot is of sufficient height and breath to enable passage of the garlic or the like through the slot. An abrasive, rotatable disk in the processing chamber has means for engaging the food processor spindle and is positioned to support and abrade the garlic or the like within the chamber. A movable gate extends across a portion of the slot and has a lowered position at which the gate prevents ejection of the garlic or the like through the slot while enabling ejection of peel pieces. The gate may be raised to enable ejection of the peeled garlic or the like through the slot.

In a further aspect of the invention, a food processor attachment has a housing adapted for disposition on a food processor over a rotary drive spindle of the processor. The attachment has a processing chamber for receiving food product that is to be peeled and has a vertically extending open area at the chamber wall. The open area is of greater height and breadth than an individual unit of the food product and the housing has a discharge channel that extends outward from the open area of the chamber. A cover engages on the housing over the processing chamber and has a passage of sufficient size to enable entry of the food product into the chamber through the cover. A rotatable disk in the chamber has an abrasive upper surface and is adapted to engage the drive spindle of the food processor. A movable gate is positioned to obstruct a portion of the open area of the chamber and to leave another portion of the open area in an unobstructed condition. The gate has a first position at which the unobstructed portion of the open area is large enough to enable centrifugal ejection of peelings from the chamber while being too small to enable ejection of the food product. At a second position of the gate the unobstructed portion of the open area is large enough to enable ejection of the food product.

The invention expedites peeling of garlic or similar food items with motor driven apparatus by eliminating steps that are needed in the use of prior devices of this kind. In particular it is not necessary that the processing chamber be opened up after each batch of the garlic or the like has been processed as manual emptying of the processing chamber through the inlet opening is unnecessary. Peelings are continuously ejected from the processing chamber as they are produced. Ejection of the peeled product may be effected simply by movement of a gate. This facilitates peeling operations during the preparation of household meals and is also particularly advantageous in high volume peeling operations in restaurants or other establishments where a series of batches of the food product are to be processed.

The invention, together with further aspects and advantages thereof, may be further understood by reference to the following description of a specific embodiment and by reference to the accompanying drawings.

BRIEF DESCRIPTION OF THE DRAWINGS

FIG. 3 is an elevation section view of the apparatus taken along line 3—3 of FIG. 2.

DETAILED DESCRIPTION OF THE PREFERRED EMBODIMENT

Figure 1:
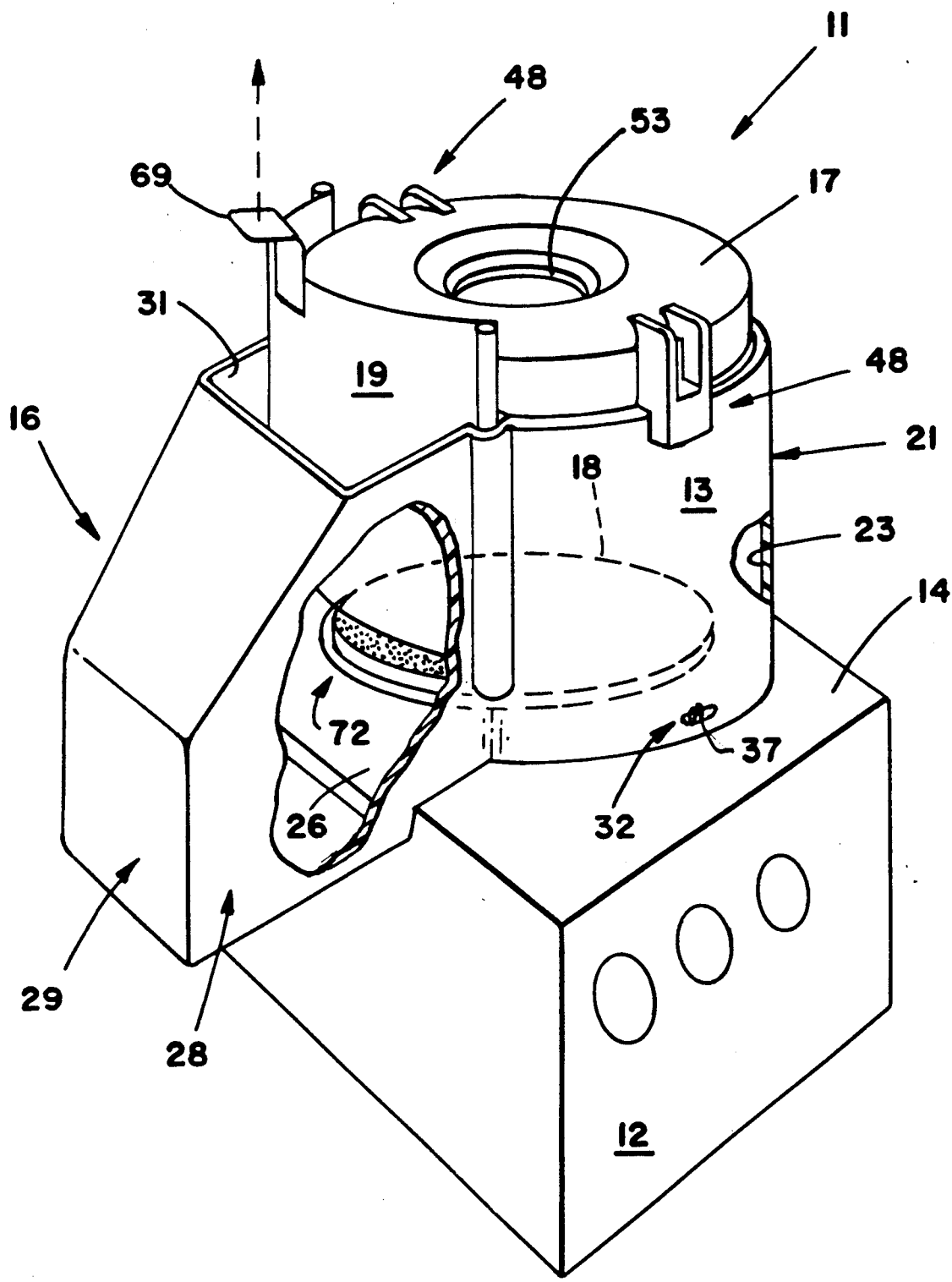
FIG. 1 is a perspective view of a food processor attachment or accessory for peeling food products in accordance with the preferred embodiment of the invention, portions of the structure being broken out in order to show certain internal components.

Referring to FIG. 1 of the drawings, the peeling apparatus 11 of this particular embodiment of the invention is an attachment or accessory designed to be used with a motor driven food processor base 12 which may itself be of known conventional construction. One suitable example of a food processor base 12 which can be used to drive the peeler attachment 11 is marketed under the trademark "robot coupe" by Robot Coupe, U.S.A., Inc., Jackson, Miss. although the invention is equally adaptable to diverse other commercially available food processors. The peeler apparatus 11 may also be provided with its own built in drive motor rather than being designed as a food processor 12 attachment.

Major components of the peeler attachment 11 include a housing 13 which can be disposed on the top surface 14 of the food processor base 12 and which has a sidewardly extending product discharge channel 16, a removable cover 17, an abrasive rotary disk 18 within the housing and a vertically movable gate 19 which controls the ejection of material from the housing.

Figure 2:
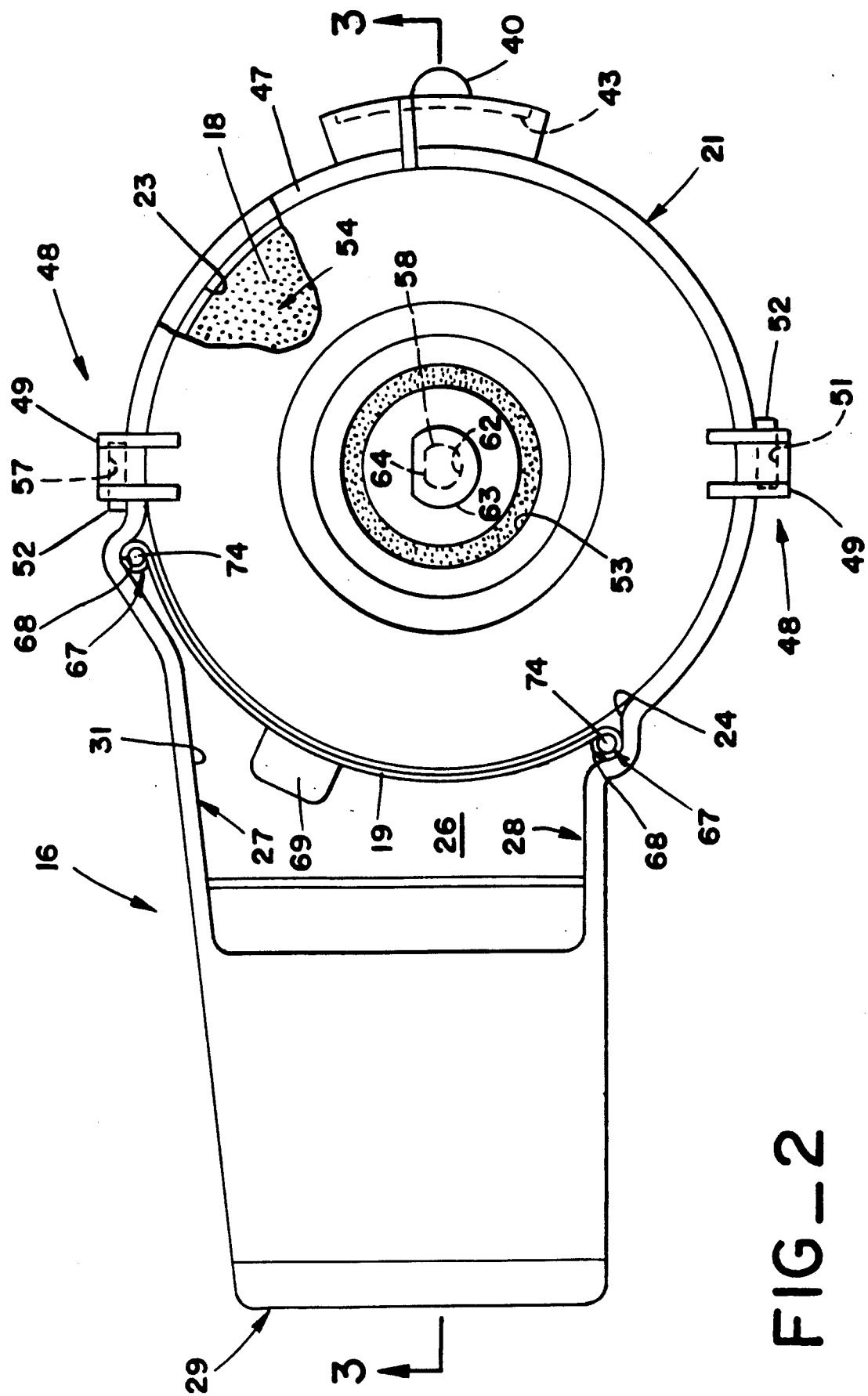
FIG. 2 is a top view of the apparatus of FIG. 1 with a portion of the structure being broken out.

Referring jointly to FIGS. 2 and 3, the housing 13 has a sidewall 21 and an elevated floor 22 which jointly form a circular processing chamber 23. The sidewall 21 does not extend completely around chamber 23 as it is interrupted by a broad vertically extending slot 24 through which peelings and, later, the peeled product are ejected from the chamber as will hereinafter be described. Discharge channel 16 extends outwardly from the circular sidewall 21 at the region of slot 24.

The discharge channel 16, which is preferably integrally formed with the chamber sidewall 21, has a sloping apron surface 26 which extends outward and downward from floor 22 at the base of slot 24. Referring again to FIG. 1, apron surface 26 has a length sufficient to carry materials ejected from chamber 23 over the food processor top surface 14 and to discharge such material at one side of the food processor 12.

To inhibit scattering of discharging material, with reference again to FIGS. 2 and 3, discharge channel 16 preferably has flat side portions 27 and 28 which extend outward from opposite sides of slot 24 for a greater distance than apron surface 26 and an end portion 29 which spans the outer ends of the side portions. End portion 29 is slanted back towards the upper end of chamber 23 to form a top cover for the outer region of the channel 16 but is preferably terminated at a location which is spaced outwardly from the chamber. This provides an opening 31 over the apron surface 26 through which an operator can view and monitor the discharging of material.

Discharge of material is more efficient if the slot 24 extends around a sizable arc of the circular chamber 23 but it is preferable that the discharge channel 16 not be overly broad as it may be desirable to channelize discharging material into narrow receptacles. These considerations are reconciled in this embodiment by orienting one of channel side portions 27 of channel 16 in a substantially tangential relationship with the circular chamber 23 while the other side portion 28 is oriented in a chordal relationship with the chamber. Thus the discharge channel 16 is asymmetrical with respect to a radius of chamber 23 and the channel side portions 27 and 28 are convergent towards the outer end of the channel.

Referring jointly to FIGS. 1 and 3, conventional means 32 are provided for engaging the housing 13 with the food processor base 12 by a combination of downward movement and rotational movement of the housing and for detaching the housing from the food processor by reversed motions. For this purpose, short horizontal slots 33 are formed at opposite sides of the base of sidewall 21 which intersect shallow vertical grooves 34 in the inside surface of the sidewall. The food processor base 12 has upwardly extending resilient lugs 36 each carrying a detent 37 which travels along a groove 34 as the housing is lowered and then engages in a slot 33 when the housing is rotated slightly. The housing 13 is also provided with a safety interlock 38 of the known type which prevents operation of the apparatus if the cover 17 is not in place. Such an interlock 38 may include a stepped vertical bore 39 in a vertical rib 40 which extends along the housing sidewall 21 and which contains a slidable plunger 41. An arcuate slot 42 intersects the upper end of bore 39 and when cover 17 is correctly engaged on housing 13 a downwardly directed tang 43 at the rim of the cover enters slot 42 and drives the plunger 41 downward to de-actuate a motor shut down switch 44 which is embedded in the top surface 14 of the food processor 12. In the absence of cover 17, a spring 46 raises plunger 41 and switch 44 prevents operation of the food processor 12.

Cover 17 has a flange 47 which extends around the periphery of the cover except for the portion of the cover that is above the chamber discharge slot 24 and which seats on the rim of chamber sidewall 21. The cover 17 is held in place by suitable disengagable fasteners 48. In this example, such fasteners 48 are angled projections 49 at opposite sides of the cover 17 which form grooves 51 into which lugs 52 on the chamber sidewall 21 may be entered by rotational movement of the cover. To enable feeding of the garlic or other foodstuff into the apparatus 11 while it is in operation, cover 17 has a central passage 53 of sufficient size to receive the garlic or the like but which is preferably small enough to inhibit entry of an operator's hand into the chamber 23.

Peeling of the product is accomplished by the disk 18 which is concentrically located in chamber 23 slightly above the chamber floor 22 and which is preferably of sufficient diameter to substantially cover the floor. Disk 18 has an abrasive upper surface 54 which may, if desired, be a layer of sandpaper adhered to the disk.

Housing 13 is formed with a disk support sleeve 56 that extends up into an annular groove 57 in the underside of the disk 18, the groove being coaxial with the disk and the axis of rotation of the disk. The disk 18 is rotated by the drive spindle 58 which extends upward from the food processor base 12 and which is itself driven by the motor 59 of the processor. An opening 61 in the center of chamber floor 22 enables the drive spindle 58 to enter into chamber 23 and into a vertical passage 62 in an upwardly extending central hub 63 of the disk 18. A side region 64 of spindle 58 is flat. Passage 62 has a conforming configuration and thus the disk 18 is constrained to rotate with the spindle.

The garlic or other food product is retained in chamber 23 during the peeling operation by the movable gate 19 which extends across a portion of the previously described slot 24 in the chamber sidewall 21 and which partially obstructs the slot. Gate 19 has side edges 67 which extend into vertical grooves 68 formed in the chamber sidewall 21 at each side of slot 24 and thus the gate is slidable in a vertical direction. An angled tab 69 is secured to the upper region of gate 19 to facilitate manual raising of the gate. The gate 19 preferably has an arcuate configuration conforming to the inner surface of chamber sidewall 21 and thus in effect forms a continuation of the chamber 23 wall in the region of the slot 24.

Gate 19 has a lowered position at which the bottom edge 71 of the gate is spaced a predetermined distance above the nearby portion of the rim of disk 18 to define a chamber outlet opening 72. This spacing is sufficiently small to prevent passage of the garlic or the like through the outlet opening 72 during a peeling operation but is large enough to enable continuous ejection of peeling pieces as they are abraded from the product during the operation. A spacing of about three eights of an inch between gate edge 71 and the periphery of disk 18 is suitable for processing garlic although the spacing may vary substantially and still achieve the desired result.

Stop mean 73 limit downward movement of gate 19 at the above described lowered position of the gate. In this embodiment such means 73 include a pair of vertical rods 74 which extend along opposite side edges 67 of gate 19 within grooves 68 and which are secured to the gate. The rods 74 extend below the bottom edge 71 of the gate 19 and contact the chamber floor 22 when the gate is at the lowered position.

In operation, with reference again to FIG. 1, the peeler attachment 11 is engaged on food processor base 12 in the manner previously described and an initial batch of garlic or the like is loaded into the attachment through the passage 53 of cover 17. A suitable waste receptacle may be placed below the discharge channel 16 to receive peelings although that is not essential in all cases. Food processor 12 is then turned on and the resulting rotation of the abrasive disk 18 rapidly abrades away the dry brittle skin of the garlic or the like. Rotation of the disk 18 imparts a similar rotation to materials carried on the disk and the resulting centrifugal force continuously expels the peeling pieces from chamber 23 through outlet opening 72.

Cover 17 is preferably transparent to enable the operator to observe the progress of the peeling operation. When peeling has been completed, the operator grasps tab 69 and raises gate 19 a distance sufficient to enable centrifugal ejection of the peeled garlic or the like from chamber 23 through outlet opening 72. Another receptacle may be substituted for the waste receptacle to receive the peeled product although this is not necessary in all usages of the apparatus.

Additional batches of garlic or the like may then be peeled by repeating the above described procedures. Cover 17 need not be removed between the processing of successive batches and there is no need for manual emptying of materials from the chamber 23 between successive peeling operations. The food processor 12 may be temporarily turned off during loading operations to assure that each individual garlic bulb in a batch is abraded for the same period of time but this is also not essential under many conditions as the softer inner tissue of the garlic bulbs does not abrade as easily as the dry skins.

The peeler attachment 11 may, if desired, have separate outlet openings 72 for the peelings and the peeled product in which case the peelings outlet in particular need not have a movable gate 19. The above described combined outlet arrangement is advantageous in that only a single discharge channel 16 is needed.

While the invention has been described with respect to a single preferred embodiment, many modifications and variations of the construction are possible and it is not intended to limit the invention except as defined in the following claims.

I claim:

1. Apparatus for peeling a food product of the type having an abradable skin, said apparatus having a housing with a sidewall bounding a processing chamber, an abrasive disk in said chamber and means for rotating said abrasive disk, wherein the improvement comprises:
    said chamber having an outlet opening at said sidewall which outlet opening is sufficiently small to prevent passage of said food product through said outlet opening during peeling operations while being sufficiently large to receive peelings which are abraded from said food product, said outlet opening being located in proximity to the periphery of said abrasive disk whereby centrifugal force expels said peelings from said chamber through said outlet opening during said peeling operations.

2. The apparatus of claim 1 further including means for enabling centrifugal ejection of the peeled food product through said chamber sidewall following a period of operation of said apparatus.

3. The apparatus of claim 1 further including means for temporarily enlarging said outlet opening following a period of operation of said apparatus to enable centrifugal ejection of the peeled food product through said outlet opening.

4. The apparatus of claim 1 wherein said outlet opening is defined in part by a slot in said housing sidewall, further including a gate obstructing a portion of said slot and forming an edge of said outlet opening, said gate having a first position at which said outlet opening is too small to receive said food product, said gate being selectively movable to a second position at which said outlet opening is enlarged and is of sufficient size to receive said food product.

5. The apparatus of claim 4 wherein said housing sidewall has a circular inner surface which is coaxial with the axis of rotation of said disk and which defines a portion of said chamber, said gate having an arcuate configuration that substantially conforms with said circular inner surface of said housing sidewall.

6. The apparatus of claim 5 wherein said slot extends along said housing sidewall in a direction parallel to said axis of rotation of said disk and wherein said gate is slidable along said slot in said direction.

7. The apparatus of claim 4 wherein said chamber has a base situated below said abrasive disk and wherein said slot of said housing sidewall extends upward from said base and said gate is slidable along said slot in a vertical direction between said first and second positions of said gate, further including stop means for limiting downward movement of said gate at a level where said outlet opening is too narrow in the vertical direction to enable entry of said food product into said outlet opening.

8. The apparatus of claim 7 wherein said stop means includes first and second rods extending downward from said gate at opposite sides of said slot in position to contact said base of said chamber when said gate is at said first position thereof.

9. The apparatus of claim 1 further including a discharge channel extending outward from said housing at the region of said outlet opening and having a slanting apron surface which extends outward and downward from said opening, side portions extending upward from opposite sides of said apron surface and an end portion spanning said side portions at a location spaced apart from said apron surface.

10. The apparatus of claim 9 wherein said chamber is substantially circular and wherein one of said side portions of said discharge channel extends outward from said housing at one slide of said slot in substantially tangential relationship with said chamber and the other of said side portions extends outward from said housing at the other side of said slot in a substantially chordal relationship with said chamber.

11. The apparatus of claim 9 wherein said discharge channel has an opening in the top thereof over said apron surface.

12. The apparatus of claim 1 further including means for selectively engaging said apparatus with a food processor which has a drive spindle extending therefrom and for selectively removing said apparatus from said food processor, and wherein said means for rotating said abrasive disk includes a hub at the center of said disk with a passage therein for receiving said drive spindle.

13. A food processor attachment for peeling garlic, said food processor having a rotary spindle extending upward therefrom for driving attachments, wherein said attachment comprises:
    a housing having a sidewall bounding a processing chamber and having a vertically extending slot in said sidewall, said slot being of sufficient breadth and height to enable passage of said garlic through said slot,
    an abrasive disk disposed in said processing chamber for rotation therein, said disk having means for engaging said food processor spindle and being positioned to support and abrade said garlic within said chamber, and
    a gate extending across a portion of said slot, said gate being movable between a lowered position at which said gate prevents ejection of said garlic from said chamber through said slot while enabling ejection of peel pieces therethrough and a raised position at which said garlic may be ejected from said chamber through said slot.

14. The apparatus of claim 13 wherein said housing has a vertical groove at each side of said slot and wherein opposite edges of said gate extend into said grooves for sliding movement therealong, and stop means for preventing further downward movement of said gate below said lowered position thereof.

15. In a food product peeling attachment for a food processor which processor has an upwardly extending rotary drive spindle for driving attachments, the combination comprising:
    a housing adapted for disposition on said food processor over said drive spindle, said housing having a processing chamber for receiving food product that is to be peeled and having a vertically extending open area at the wall of said chamber that is of greater height and breadth than an individual unit of said food product to enable sideward ejection of said food product from said chamber through said open area, said housing further having a discharge channel extending outward from the region of said open area of said chamber,
    a cover engaged on said housing over said processing chamber and having a passage of sufficient size to enable entry of said food product into said chamber through said cover,
    a disk disposed in said processing chamber for rotation therein, said disk having an abrasive upper surface and being adapted for engagement with said drive spindle of said food processor, and
    a movable gate positioned to obstruct a portion of said open area of said chamber and to leave another portion of said open area in an unobstructed condition, said gate having a first position at which the unobstructed portion of said open area is large enough to enable centrifugal ejection of peelings from said chamber while being too small to enable ejection of said food product, said gate having a second position at which the unobstructed portion of said open area is large enough to enable ejection of said food product through said open area.

* * * * *